(12) United States Patent
Marum et al.

(10) Patent No.: US 9,934,291 B2
(45) Date of Patent: *Apr. 3, 2018

(54) DYNAMIC PRESENTATION OF A RESULTS SET BY A FORM-BASED SOFTWARE APPLICATION

(75) Inventors: Matthew G. Marum, Cary, NC (US); Samuel Padgett, Raleigh, NC (US); Steven K. Speicher, Holly Springs, NC (US); Michael J. Tabb, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 741 days.

This patent is subject to a terminal disclaimer.

(21) Appl. No.: 13/524,106

(22) Filed: Jun. 15, 2012

(65) Prior Publication Data

US 2013/0339834 A1    Dec. 19, 2013

(51) Int. Cl.
G06F 17/30 (2006.01)
G06F 17/21 (2006.01)
G06F 17/24 (2006.01)

(52) U.S. Cl.
CPC ...... *G06F 17/30554* (2013.01); *G06F 17/211* (2013.01); *G06F 17/212* (2013.01); *G06F 17/243* (2013.01)

(58) Field of Classification Search
CPC ..... G06F 17/211; G06F 17/243; G06F 17/248
USPC ....................................................... 715/222
See application file for complete search history.

(56) References Cited

U.S. PATENT DOCUMENTS

| 6,314,415 B1* | 11/2001 | Mukherjee ............ G06F 9/4443 706/45 |
| 2002/0152189 A1 | 10/2002 | Crim |
| 2006/0004718 A1 | 1/2006 | McCully et al. |
| 2006/0107204 A1* | 5/2006 | Epstein ................. G06F 17/212 715/243 |

(Continued)

OTHER PUBLICATIONS

Lok et al., "A Survey of Automated Layout Techniques for Information Presentations," 2001, p. 1-8, SmartGraphics '01 Hawthorne, NY USA (Year: 2001).*

(Continued)

*Primary Examiner* — Andrew T McIntosh
(74) *Attorney, Agent, or Firm* — Yee & Associates, P.C.; Maeve M. Carpenter (57) ABSTRACT

A method for dynamically generating an optimal form definition for a results set can begin with the receipt of a results set by a form-based presentation optimizer. The results set can comprise data records having at least one data field. Form definitions applicable to the received results set can be identified. A form definition can define user interface elements and their configuration within a user interface of the form-based software application. An optimal form definition can be dynamically synthesized from the identified form definitions and predefined presentation optimization rules. The optimal form definition can define the configuration of user interface elements that optimally present the results set. The contents of the optimal form definition can vary based upon internal and external parameters that affect operation of the form-based software application and/or form-based presentation optimizer. The optimal form definition can then be conveyed to the form-based software application for rendering.

20 Claims, 4 Drawing Sheets

(56) References Cited

U.S. PATENT DOCUMENTS

2007/0150822 A1* 6/2007 Mansour .............. G06F 9/4445
                                                        715/762
2008/0244560 A1   10/2008 Neagu et al.
2011/0099494 A1*  4/2011 Yan et al. .................... 715/765
2013/0339835 A1   12/2013 Marum et al.

OTHER PUBLICATIONS

Office Action, dated Oct. 6, 2014, regarding U.S. Appl. No. 13/561,504, 16 pages.
Final Office Action, dated Apr. 22, 2014, regarding U.S. Appl. No. 13/561,504, 15 pages.
Notice of Allowance, dated Nov. 22, 2017, regarding U.S. Appl. No. 13/561,504, 15 pages.

* cited by examiner

DYNAMIC PRESENTATION OF A RESULTS SET BY A FORM-BASED SOFTWARE APPLICATION

BACKGROUND

The present invention relates to the field of data presentation and, more particularly, to the dynamic presentation of a results set by a form-based software application.

It is common for software applications to present users with information retrieved from a database. The database executes a query and returns a results set of records to the calling software application. Presentation and/or formatting of the data contained in the results set is performed by the software application; typically, using a predefined template or form definition. Thus, current approaches create a static, one-to-one relationship between a data element of the results set and how it is visually presented to the user.

To overcome this static display, many conventional software applications allow the user to indicate preferences regarding how data is presented. However, these preferences are limited to options that are supported by the corresponding form definition or template. That is, the designer of the form or template being used to present the results set retains control over how the data is allowed to be displayed. Thus, the effectiveness of the data's presentation is dependent upon the designer's skill with the software application.

Further, many conventional software applications limit the presentation of results sets to a tabular format. While a table is typically sufficient for viewing textual data, numerical data often requires reference points or additional calculation. For example, a value of '3' for a rating is ambiguous without knowing the limits of the rating scale. Thus, presenting the rating as a slider bar spanning the minimum and maximum limit values of the rating scale with the bar at the value '3' provides the user with all the necessary information in a single visual package; presenting the values of the rating and the limits of the rating scale alphanumerically requires the user to take additional time to mentally visualize this same relationship between the values.

BRIEF SUMMARY

One aspect of the present invention can include a method for dynamically generating an optimal form definition for a results set. Such a method can begin with the receipt of a results set by a form-based presentation optimizer. The results set can comprise data records having at least one data field. Form definitions applicable to the received results set can be identified. A form definition can define user interface elements and their configuration within a user interface of the form-based software application. An optimal form definition can be dynamically synthesized from the identified form definitions and predefined presentation optimization rules. The optimal form definition can define the configuration of user interface elements that optimally present the results set. The contents of the optimal form definition can vary based upon internal and external parameters that affect operation of the form-based software application and/or form-based presentation optimizer. The optimal form definition can then be conveyed to the form-based software application for rendering.

Another aspect of the present invention can include a method for dynamically presenting a results set. Such a method can begin with the receipt of a data request by a form-based software application. A results set that fulfills the data request can be obtained from a database server. A form-based presentation optimizer can be invoked to dynamically generate an optimal form definition for the obtained results set. The optimal form definition can define a configuration of user interface elements that optimally present the results set. The results set can then be presented within a user interface using the user interface elements and configuration defined in the optimal form definition.

Yet another aspect of the present invention can include a computer program product that includes a computer readable storage medium having embedded computer usable program code. The computer usable program code can be configured to receive a results set that comprises data records having at least one data field. The computer usable program code can be configured to identify form definitions that are applicable to the received results set. A form definition can define user interface elements and their configuration for presenting the results set within a user interface of the form-based software application. The computer usable program code can be configured to dynamically synthesize an optimal form definition from the identified form definitions and predefined presentation optimization rules. The optimal form definition can define the configuration of user interface elements that optimally present the results set. The contents of the optimal form definition can vary based upon internal and external parameters. The computer usable program code can be configured to convey the optimal form definition to the form-based software application for rendering.

DETAILED DESCRIPTION

The present invention discloses a solution for dynamically presenting a results set within a form-based software application. A form-based presentation optimizer can be used to synthesize an optimal form definition for a results set based upon existing form definitions and presentation optimization rules that are applicable to the results set. The form-based software application can then use the dynamically generated optimal form definition to present the results set within a user interface.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
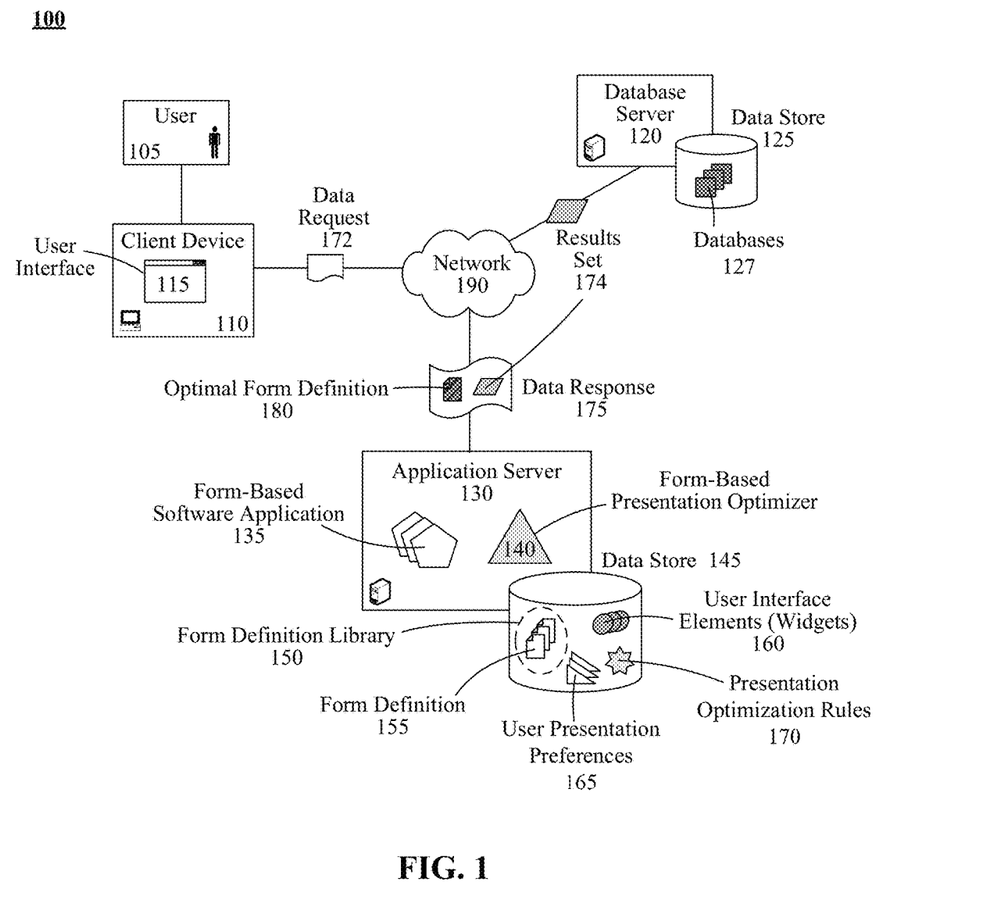
FIG. 1 is a schematic diagram illustrating a system that utilizes a form-based presentation optimizer to dynamically present a results set within the user interface of a form-based software application in accordance with embodiments of the inventive arrangements disclosed herein.

FIG. 1 is a schematic diagram illustrating a system 100 that utilizes a form-based presentation optimizer 140 to dynamically present a results set 174 within the user interface 115 of a form-based software application 135 in accordance with embodiments of the inventive arrangements disclosed herein. In system 100, the user 105 can initiate a data request 172 from the user interface 115 of the form-based software application 135.

The data request 172 can be an electronic message created by the user interface 115 in response to actions performed by the user 105. The data request 172 can include a variety of information of import to the form-based software application 135, such as a user 105 identifier, session identifier, parameter values regarding the data that the user 105 is requesting, and the like. For example, the data request 172 can indicate that User B 105 is requesting presentation of sales records for the year 2011 in the standard year-end sales report format.

The user interface 115 can be a graphical interaction mechanism that allows the user 105 to execute the functionality of the form-based software application 135. The user interface 115 can operate upon a client device 110. The client device 110 can represent a variety of computing devices capable of supporting operation of the user interface 115 and communicating with the form-based software application 135 over the network 190.

The form-based software application 135 can be a computer program designed to utilize forms for data presentation and/or capture like LOTUS FORMS. Since form-based software applications 135 are well-known by those skilled in the art, only the specific aspects of the form-based software application 135 can be discussed herein as related to this embodiment of the present disclosure.

The form-based software application 135 can operate upon an application server 130 having an accessible data store 145. The application server 130 can represent the hardware and/or software components necessary to support operation of various installed software applications and communicate with other entities, such as the client device 110 and database server 120, over the network 190.

The data to be presented by the form-based software application 135 in response to the data request 172 can be a results set 174 obtained from a database server 120. The database server 120 can represent the hardware and/or software components required to provide access to one or more databases 127 contained in an associated data store 125. The results set 174 can represent at least one record generated from the execution of a database query by the database server 120.

The form-based software application 135 can be configured to generate a database query that, when executed by the database server 120, will produce a results set 174 that fulfills the received data request 172. The database query can be written using a standardized query language appropriate for the database server 120.

The form-based software application 135 can utilize a form definition library 150 and various user interface elements 160 contained in the data store 145. A user interface element 160, also referred to as a widget, can be a distinct graphical component that is rendered within the user interface 115 to display one or more data items. Examples of user interface elements 160 can include, but are not limited to, a table, a slider bar, a chart, a graph, a rating scale, a text field, a video player, an audio player, a set of checkboxes, a set of images, a combination thereof, and the like.

The form definition library 150 can be a collection of form definitions 155 that define the type and layout of user interface elements 160 used by the form-based software application 135 to present data within the user interface 115. A form definition 155 can be written using a standardized language supported by the form-based software application 135, such as the Extensible Forms Description Language (XFDL).

Conventionally, the form-based software application 135 can always respond to a data request 172 with the specified form definition 155; changing how the form-based software application 135 can present the data responsive to the data request 172 requires modifying the specific form definition 155. Thus, a conventional form-based software application 135 can be thought of as a static system with a one-to-one relationship between a data request 172 and the form definition 155 used to display the requested data.

Since form definitions 155 are created by various users 105, the skill of the authoring user 105 can affect the effectiveness of data presentation in a conventional system. That is, a form definition 155 created by a user 105 who has a relatively high level of proficiency can present data in a more stream-lined and organized manner, using user interface elements 160 that reflect their level of proficiency.

For example, a user 105 with a low level of proficiency can present a group of records textually in a table, whereas a user 105 with a higher level of proficiency can be more likely to use different types of user interface elements 160 like slider bars and charts that provide better visual presentations of individual data fields or groups of data fields.

The use of a form-based presentation optimizer 140 in conjunction with the form-based software application 135 can present the results set 174 for the data request 172 to the user 105 in a dynamically-determined and optimal manner. The form-based presentation optimizer 140 can be a software program designed to dynamically-determine an optimal form definition 180 based upon the contents of the results set 174, existing presentations of the contents of the results set 174 within the form definition library 150, and a set of presentation optimization rules 170.

The presentation optimization rules 170 can define how the form-based presentation optimizer 140 determines which user interface elements 160 are optimal for presenting the results set 174. The presentation optimization rules 170 can be created and/or maintained using a corresponding user interface 115 by a user 105 having the appropriate privileges.

The optimal form definition 180 can be a dynamically-generated form definition 155 that optimally presents the results set 174 for the data request 172. That is, the optimal form definition 180 can define the user interface elements 160 and/or layout for the user interface elements 160 that is determined to be optimal for presenting the contents of the results set 174.

In essence, the form-based presentation optimizer 140 can be configured determine which user interface elements 160 used in the form definitions 155 that are applicable to the results set 174 are considered to be optimal based upon the presentation optimization rules 170. Determination of the optimal user interface elements 160 by the form-based presentation optimizer 140 can be implemented in various ways.

One approach can be based upon an analysis of the form definitions 155 that are applicable to the results set 174. For example, an optimal user interface element 160 can be one that is most often used within form definitions 155 to present the record or specific data field.

Another approach can be to encode additional optimization information within the form definition 155. For example, XFDL tags can be defined that represent optimization information for use by the form-based presentation optimizer 140.

Yet another approach can encode optimization information as part of a data field's data type definition within the database 127. However, this approach can have less flexibility than the other approaches with respect to supporting multiple presentation styles for the same data field.

Additionally, format information can be inferred from the existing form definitions 155 to influence the presentation features of user interface elements 160 within the optimal form definition 180. For example, if a textual user interface element 160 is determined to be the optimal presentation and the textual user interface element 160 occurs within the form definition library 150 with medium-sized text, then the optimal form definition 180 can also indicate the use of medium-sized text for this user interface element 160.

Further, usage information about the form definitions 155 can be gathered and used to influence the determination of the optimal user interface elements 160. For example, a user interface element 160 from a form definition 155 that is more frequently used can be weighted more than an alternate user interface element 160 in a form definition 155 that is less-frequently accessed.

It should be noted that the use of variables that can change over time for the determination of user interface elements 160 to include in the optimal form definition 180 can further add to the dynamic nature of the optimal form definition 180. That is, the results set 174 for the same data request 172 request made by the same user 105 on two different days can be presented in two different ways.

The form-based presentation optimizer 140 can also be configured to utilize user presentation preferences 165. The user presentation preferences 165 can define a user's 105 preferences for how different types of data are presented by user interface elements 160 in the user interface 115.

For example, the user presentation preferences 165 can indicate that a user 105 prefers to view numeric fields having a maximum and minimum value as a bar chart over a slider bar and the slider bar presentation over a text-based table format.

The priority of user presentation preferences 165 with respect to presentation optimization rules 170 can vary based upon implementation and/or the specific type of data and/or user interface element 160. For example, an optimal user interface element 160 identified as "required" by the presentation optimization rules 170 may not be influenced by user presentation preferences 165.

Once the form-based presentation optimizer 140 generates the optimal form definition 180, a data response 175 containing the optimal form definition 180 and/or results set 174 can be sent to and rendered by the user interface 115. Since the conditions that govern generation of the optimal form definition 180 can change over time, the optimal form definition 180 need not be saved for later use by the form-based software application 135. That is, the optimal form definition 180 can be thought of as a temporary, instance-based data construct that is discarded after it is used to present the results set 174.

In another contemplated embodiment of the present disclosure, the form-based presentation optimizer 140 can be an integrated component of the form-based software application 135. In another embodiment, the form-based presentation optimizer 140 can operate from a server (not shown) that is separate from the application server 130 having a separate data store containing the user presentation preferences 165 and presentation optimization rules 170.

It is important to note that the concepts illustrated in system 100 can be applied to other types of software applications and/or systems that are not form-based, but that utilize predefined layouts or templates for aggregating instances of user interface elements 160 to present the data of a results set 174.

Network 190 can include any hardware/software/and firmware necessary to convey data encoded within carrier waves. Data can be contained within analog or digital signals and conveyed though data or voice channels. Network 190 can include local components and data pathways necessary for communications to be exchanged among computing device components and between integrated device components and peripheral devices. Network 190 can also include network equipment, such as routers, data lines, hubs, and intermediary servers which together form a data network, such as the Internet. Network 190 can also include circuit-based communication components and mobile communication components, such as telephony switches, modems, cellular communication towers, and the like. Network 190 can include line based and/or wireless communication pathways.

As used herein, presented data stores 125 and 145 can be a physical or virtual storage space configured to store digital information. Data stores 125 and 145 can be physically implemented within any type of hardware including, but not limited to, a magnetic disk, an optical disk, a semiconductor memory, a digitally encoded plastic memory, a holographic memory, or any other recording medium. Data stores 125 and 145 can be a stand-alone storage unit as well as a storage unit formed from a plurality of physical devices. Additionally, information can be stored within data stores 125 and 145 in a variety of manners. For example, information can be stored within a database structure or can be stored within one or more files of a file storage system, where each file may or may not be indexed for information searching purposes. Further, data stores 125 and/or 145 can utilize one or more encryption mechanisms to protect stored information from unauthorized access.

Figure 2:
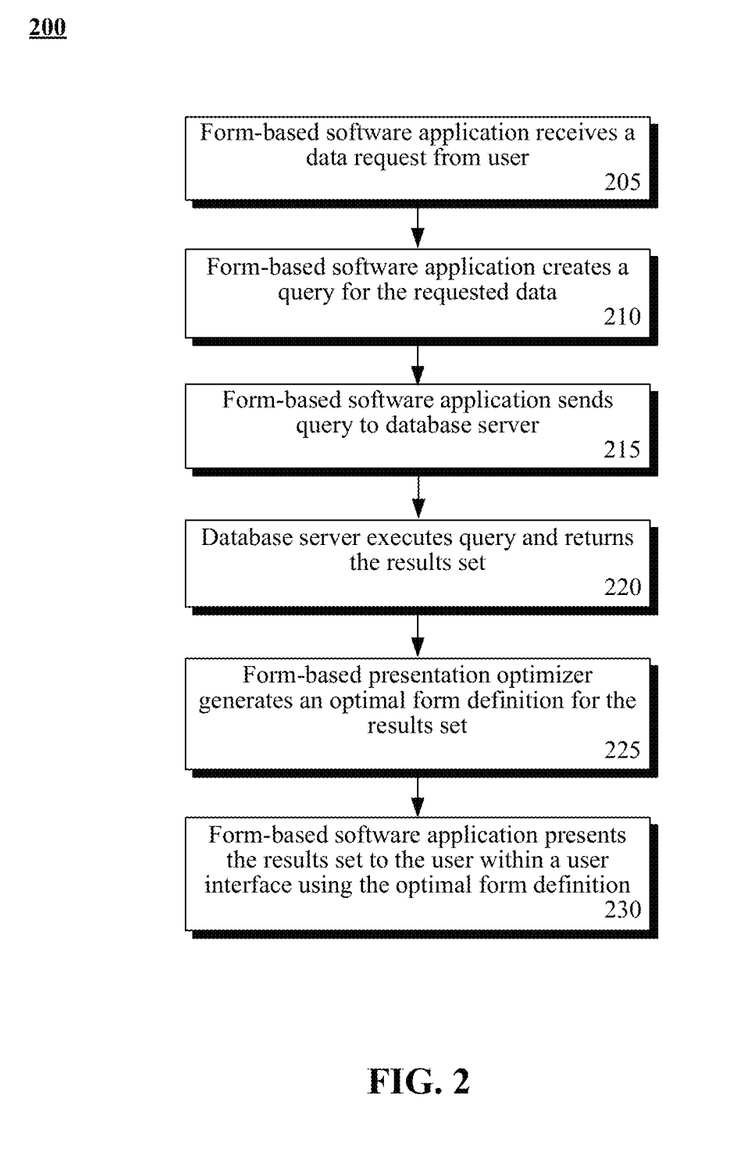
FIG. 2 is a flowchart of a method describing the basic interactions in a system using the form-based presentation optimizer in accordance with an embodiment of the inventive arrangements disclosed herein.

FIG. 2 is a flowchart of a method 200 describing the basic interactions in a system using the form-based presentation optimizer in accordance with embodiments of the inventive arrangements disclosed herein. Method 200 can be performed within the context of system 100.

Method 200 can begin in step 205 where the form-based software application can receive a data request from a user. The form-based software application can create a query for the requested data in step 210. In step 215, the form-based software application can send the query to the database server.

The database server can execute the query and return the results set in step 220. In step 225, the form-based presentation optimizer can generate the optimal form definition for the results set. The form-based software application can then present the results set to the user within a user interface using the optimal form definition in step 230.

Figure 3:
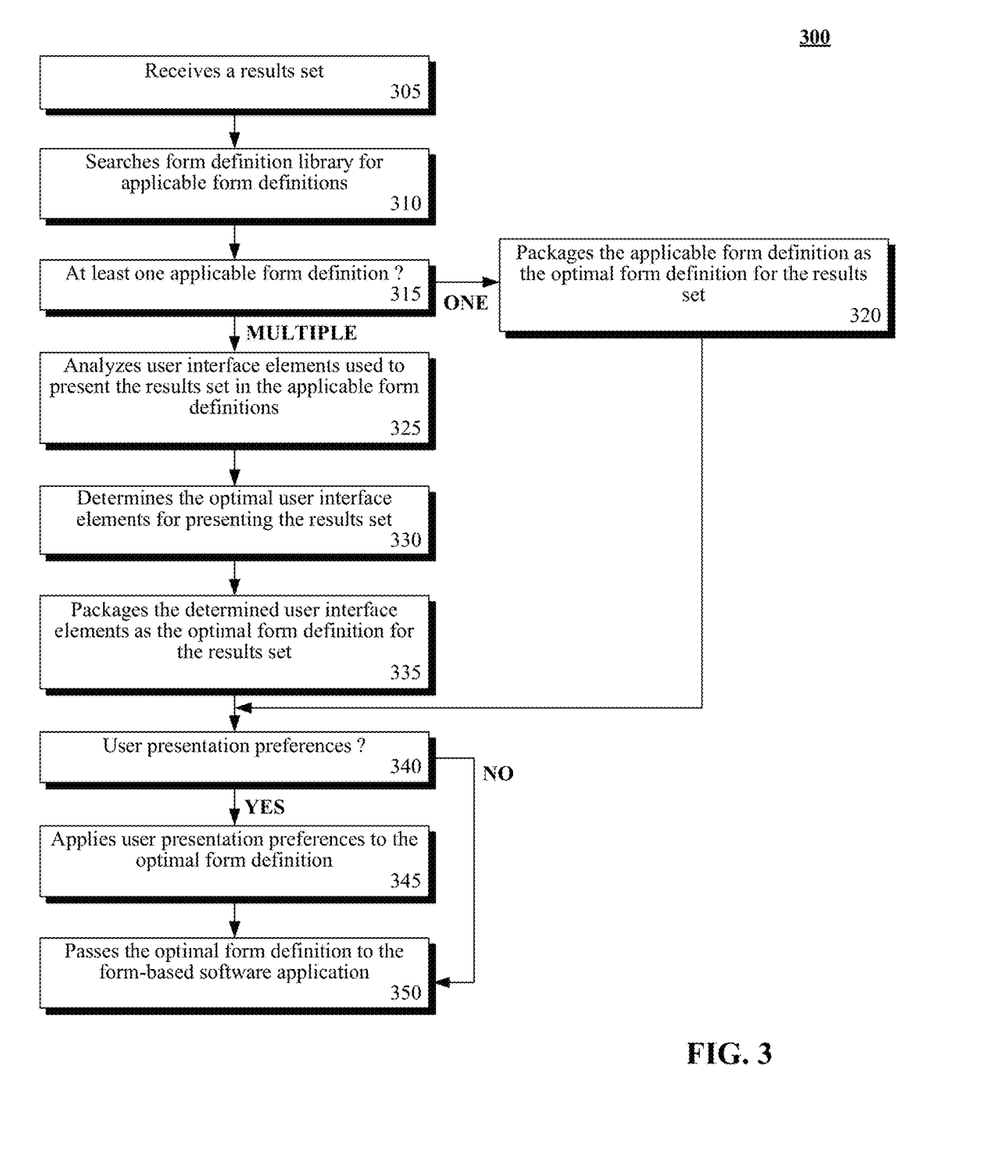
FIG. 3 is a flowchart of a method detailing operation of the form-based presentation optimizer in accordance with an embodiment of the inventive arrangements disclosed herein.

FIG. 3 is a flowchart of a method 300 detailing operation of the form-based presentation optimizer in accordance with embodiments of the inventive arrangements disclosed herein. Method 300 can be performed within the context of system 100, and/or in conjunction with method 200.

Method 300 can begin in step 305 where the form-based presentation optimizer can receive a results set. Depending upon the specific implementation, the form-based presentation optimizer can receive the results set from the database server or the form-based software application that previously received the results set from the database server.

The form definition library can be searched for form definitions that are applicable to the results set in step 310. A form definition can be determined applicable if it presents one or more data fields contained in the results set. In step 315, it can be determined if at least one form definition is applicable to the results set.

When only one form definition is determined to be applicable to the results set, step 320 can be performed where the applicable form definition can be packaged as the optimal form definition for the results set. When multiple form definitions are determined to be applicable to the results set, then step 325 can execute where the user interface elements used to present the results set in the applicable form definitions can be analyzed.

Based upon this analysis, the optimal user interface elements for presenting the results set can be determined in step 330. In step 335, the determined user interface elements can be packaged as the optimal form definition for the results set.

Upon completion of step 335 or step 320, it can be determined if user presentation preferences exist for the results set in step 340. User information used to determine the existence of user presentation preferences can be passed to the form-based presentation optimizer in the data message containing the results set. Alternately, user information can be supplied by the form-based software application.

When user presentation preferences exist for the results set, step 345 can be performed where the user presentation preferences can be applied to the optimal form definition. When user presentation preferences do not exist or upon completion of step 345, step 350 can execute where the form-based presentation optimizer can pass the optimal form definition to the form-based software application.

Alternately, steps 340 and 345 can be performed prior to the creation of the optimal form definition, steps 335 and/or 320.

Figure 4:
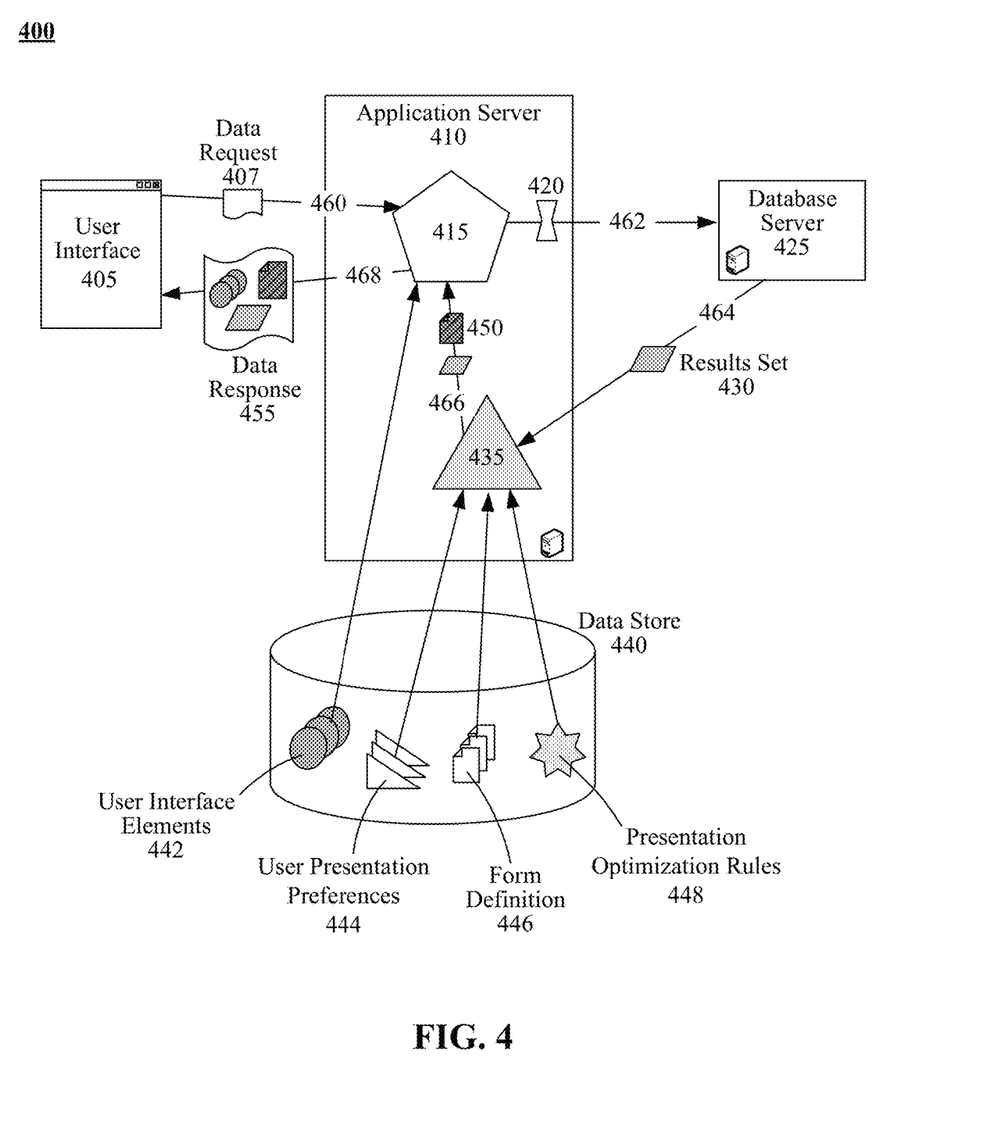
FIG. 4 is an illustrated process flow illustrating the generation and usage of an optimal form definition by a form-based presentation optimizer to dynamically present a results set in accordance with embodiments of the inventive arrangements disclosed herein.

FIG. 4 is an illustrated process flow 400 illustrating the generation and usage of an optimal form definition 450 by a form-based presentation optimizer 435 to dynamically present a results set 430 in accordance with embodiments of the inventive arrangements disclosed herein. Process flow 400 can be performed within the context of system 100, and/or methods 200, and/or 300.

In process flow 400, a data request 407 can be sent 460 from the user interface 405 to the form-based software application 415 operating on an application server 410. The form-based software application 415 can generate a database query 420 and send 462 the database query 420 to the database server 425.

The database server 425 can execute the database query 420, generating the results set 430. The database server 425 can send 464 the results set 430 to the form-based presentation optimizer 435. Alternately, the database server 425 can send 464 the results set 430 to the form-based software application 415, which would then pass the results set 430 to the form-based presentation optimizer 435.

The form-based presentation optimizer 435 can then generate the optimal form definition 450 using applicable user presentation preferences 444, form definitions 446, and presentation optimization rules 448 from data store 440. The form-based presentation optimizer 435 can convey 466 the optimal form definition 450 and results set 430 to the form-based software application 415.

The form-based software application 415 can then create and convey 468 a data response 455 to the user interface 405. The data response 455 can contain the information necessary for the user interface 405 to render the user interface elements 442 defined in the optimal form definition 450 to present the results set 430.

As used herein, presented data store 440 can be a physical or virtual storage space configured to store digital information. Data store 440 can be physically implemented within any type of hardware including, but not limited to, a magnetic disk, an optical disk, a semiconductor memory, a digitally encoded plastic memory, a holographic memory, or any other recording medium. Data store 440 can be a stand-alone storage unit as well as a storage unit formed from a plurality of physical devices. Additionally, information can be stored within data store 440 in a variety of manners. For example, information can be stored within a database structure or can be stored within one or more files of a file storage system, where each file may or may not be indexed for information searching purposes. Further, data store 440 can utilize one or more encryption mechanisms to protect stored information from unauthorized access.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for dynamically generating an optimal form definition for a results set comprising:
    receiving the results set by a form-based presentation optimizer running on an application server, wherein the results set (1) comprises at least one data record having at least one data field that satisfies a database query generated by a form-based software application running on the application server responsive to receiving a data request from a client device and (2) is received from a database server in response to the database query;
    identifying, from a form definition library maintained by the application server, at least one form definition that is applicable to the received results set, wherein the at least one form definition is associated with the form-based software application, wherein the results set is to be presented within a user interface of the form-based software application, wherein a form definition defines at least one user interface element for presenting data and a configuration of the at least one user interface element within the user interface;
    dynamically synthesizing an optimal form definition from the at least one identified form definition and at least one predefined presentation optimization rule, wherein the optimal form definition is dynamically synthesized by modifying the at least one identified form definition, wherein the optimal form definition defines the configuration of user interface elements that optimally present the results set, wherein contents of the optimal form definition vary based upon at least one existing presentation of contents of the results set, the at least one predefined presentation optimization rule, and the form-based presentation optimizer;
    conveying at least the optimal form definition to the form-based software application for rendering; and
    creating and conveying to the user interface, by the form-based software application, a data response that contains information necessary for the user interface to render the user interface elements defined in the optimal form definition.

2. The method of claim 1, wherein dynamically synthesizing the optimal form definition further comprises:
    analyzing the at least one identified form definition with respect to usage of user interface elements that present data contained in the results set, wherein user interface elements contained in the at least one identified form definition that are unrelated to the results set are disregarded in said analysis;
    identifying the at least one predefined presentation optimization rule that is applicable to at least one of the identified form definitions and the user interface elements, wherein the identified at least one predefined presentation optimization rule defines how the form-based presentation optimizer determines which user interface elements are optimal for presenting the results set received from the database in response to the database query;
    based upon said analysis and the identified at least one predefined presentation optimization rule, determining the user interface elements that optimally present the results set; and
    packaging the determined user interface elements as the optimal form definition.

3. The method of claim 2, wherein determining the user interface elements further comprises:

for each user interface element used to present a specific portion of the results set, dynamically calculating an optimality score for a user interface element, wherein the optimality score is a quantification representing a degree to which the user interface element optimally presents the identical portion of the results set; and selecting the user interface element having a best optimality score as the user interface element that optimally presents the specific portion of the results set, wherein the best optimality score is identified with respect to a predetermined optimality scale.

4. The method of claim 3, wherein, when the form-based presentation optimizer utilizes user presentation preferences, calculating the optimality score further comprises:

identifying a user presentation preference associated with a user of the form-based software application that affects the user interface element, wherein said user performed actions within the form-based software application that resulted in the generation of the results set, and, wherein the at least one user presentation preference represents a preferentiality for the user interface element; and adjusting the calculated optimality score of the user interface element in accordance with the user presentation preference.

5. The method of claim 1, wherein the form-based presentation optimizer is an add-on component of the form-based software application.

6. The method of claim 1, wherein the form-based presentation optimizer receives the results set from one of the form-based software application and a database server.

7. The method of claim 1, wherein the user interface elements comprise at least one of a table element, a graph, a chart, a slider bar, a text box, a plurality of selectable elements, a rating scale, an image viewer, a video player, an audio player, a hyperlink, and an animation.

8. The method of claim 1, wherein the results set is conveyed to the form-based software application with the optimal form definition.

9. A method for dynamically presenting a results set comprising:

receiving, at an application server, a data request from a form-based software application on a client device;

transmitting, from the application server to a database server, a database query corresponding to the data request;

receiving, at the application server from the database server, a results set that fulfills the data request;

identifying at least one form definition that is applicable to the received results set;

invoking a form-based presentation optimizer to dynamically generate an optimal form definition for the obtained results set, wherein the optimal form definition is dynamically generated by modifying the at least one identified form definition, wherein the optimal form definition defines a configuration of user interface elements that optimally present the results set and transmitting, from the application server to the client device, the optimal form definition and the results set;

presenting the results set within a user interface of the client device using the user interface elements and configuration defined in the optimal form definition.

10. The method of claim 9, wherein obtaining the results set further comprises:

constructing the database query in a standardized query definition language supported by the database server that corresponds to the data request;

conveying the constructed query to the database server for execution; and receiving the results set from the database server.

11. The method of claim 9, wherein the form-based presentation optimizer generates the optimal form definition using existing form definitions of the form-based software application and a plurality of presentation optimization rules.

12. The method of claim 9, wherein the user interface elements comprise at least one of a table element, a graph, a chart, a slider bar, a text box, a plurality of selectable elements, a rating scale, an image viewer, a video player, an audio player, a hyperlink, and an animation.

13. The method of claim 9, wherein invoking the form-based presentation optimizer further comprises:

encapsulating the results set and instance information in an electronic message; and sending the electronic message to the form-based presentation optimizer.

14. The method of claim 9, wherein the form-based presentation optimizer is an add-on component of the form-based software application.

15. A computer program product comprising a non-transitory computer readable storage medium having computer usable program code embodied therewith, the computer usable program code comprising:

computer usable program code, stored in the non-transitory computer readable storage medium, configured to receive, from a database server in response to a database query generated by a form-based software application running on the application server responsive to receiving a data request from a client device, a results set that comprises at least one data record having at least one data field that satisfies the database query;

computer usable program code, stored in the non-transitory computer readable storage medium, configured to identify, from a form definition library maintained by the application server, at least one form definition that is applicable to the received results set, wherein the at least one form definition is associated with the form-based software application, wherein the results set is to be presented within a user interface of the form-based software application, wherein a form definition defines at least one user interface element for presenting data and a configuration of the at least one user interface element within the user interface;

computer usable program code, stored in the non-transitory computer readable storage medium, configured to dynamically synthesize an optimal form definition from the at least one identified form definition and at least one predefined presentation optimization rule, wherein the optimal form definition is dynamically synthesized by modifying the at least one identified form definition, wherein the optimal form definition defines the configuration of user interface elements that optimally present the results set, wherein contents of the optimal form definition vary based upon at least one existing presentation of contents of the results set, the at least one predefined presentation optimization rule, and the form-based presentation optimizer;

computer usable program code, stored in the non-transitory computer readable storage medium, configured to convey at least the optimal form definition to the form-based software application for rendering; and computer usable program code, stored in the non-transitory computer readable storage medium, configured to create and convey to the user interface, by the form-based software application, a data response that contains information necessary for the user interface to render the user interface elements defined in the optimal form definition.

16. The computer program product of claim 15, wherein the user interface elements comprise at least one of a table element, a graph, a chart, a slider bar, a text box, a plurality of selectable elements, a rating scale, an image viewer, a video player, an audio player, a hyperlink, and an animation.

17. The computer program product of claim 15, wherein synthesizing the optimal form definition further comprises:
   computer usable program code, stored in the non-transitory computer readable storage medium, configured to analyze the at least one identified form definition with respect to usage of user interface elements that present data contained in the results set, wherein user interface elements contained in the at least one identified form definition that are unrelated to the results set are disregarded in said analysis;
   computer usable program code, stored in the non-transitory computer readable storage medium, configured to identify the at least one predefined presentation optimization rule that is applicable to at least one of the identified form definitions and the user interface elements, wherein the identified at least one predefined presentation optimization rule defines how the form-based presentation optimizer determines which user interface elements are optimal for presenting the results set received from the database in response to the database query;
   computer usable program code, stored in the non-transitory computer readable storage medium, configured to, based upon said analysis and the identified at least one predefined presentation optimization rule, determine the user interface elements that optimally present the results set; and
   computer usable program code, stored in the non-transitory computer readable storage medium, configured to package the determined user interface elements as the optimal form definition.

18. The computer program product of claim 17, wherein determining the user interface elements further comprises:
   computer usable program code, stored in the non-transitory computer readable storage medium, configured to, for each user interface element used to present a specific portion of the results set, dynamically calculate an optimality score for a user interface element, wherein the optimality score is a quantification representing a degree to which the user interface element optimally presents the identical portion of the results set; and
   computer usable program code, stored in the non-transitory computer readable storage medium, configured to select the user interface element having a best optimality score as the user interface element that optimally presents the specific portion of the results set, wherein the best optimality score is identified with respect to a predetermined optimality scale.

19. The computer program product of claim 18, wherein, when user presentation preferences are utilized, calculating the optimality score further comprises:
   computer usable program code, stored in the non-transitory computer readable storage medium, configured to identify a user presentation preference associated with a user of the form-based software application that affects the user interface element, wherein said user performed actions within the form-based software application that resulted in the generation of the results set, and, wherein the at least one user presentation preference represents a preferentiality for the user interface element; and
   computer usable program code, stored in the non-transitory computer readable storage medium, configured to adjust the calculated optimality score of the user interface element in accordance with the user presentation preference.

20. The computer program product of claim 16, wherein the results set is conveyed to the form-based software application with the optimal form definition.

* * * * *